United States Patent [19]

Baxmann et al.

[11] 4,000,354
[45] Dec. 28, 1976

[54] PROCESS FOR THE PRODUCTION OF ISOTACTIC POLYPROPYLENE

[75] Inventors: Fritz Baxmann; Walter Dittmann; Albert Frese; Johann Dietrich; Wolfgang Kilian, all of Marl, Germany

[73] Assignee: Chemische Werke Huls Aktiengesellschaft, Marl, Germany

[22] Filed: July 23, 1974

[21] Appl. No.: 491,172

[30] Foreign Application Priority Data

July 28, 1973  Germany .................... 2338478

[52] U.S. Cl. ................ 526/158; 526/159; 526/350; 526/351; 526/903
[51] Int. Cl.$^2$ ............... C08F 4/66; C08F 10/06
[58] Field of Search .......... 260/88.2, 93.7, 94.9 B, 260/94.9 C, 94.9 E; 526/158, 159, 903

[56] References Cited

UNITED STATES PATENTS

| | | | |
|---|---|---|---|
| 3,197,452 | 7/1965 | Nalta et al. | 260/93.7 |
| 3,332,921 | 7/1967 | Cleary | 260/88.2 |
| 3,461,110 | 8/1969 | Rice et al. | 260/93.7 |
| 3,479,329 | 11/1969 | Chauvin et al. | 260/94.9 E |
| 3,582,987 | 6/1971 | Nalta et al. | 260/93.7 |
| 3,705,884 | 12/1972 | Frese | 260/93.7 |
| 3,794,627 | 2/1974 | Giachetto | 260/88.2 |

*Primary Examiner*—Edward J. Smith
*Attorney, Agent, or Firm*—Millen, Raptes & White

[57] ABSTRACT

Polypropylene can be polymerized with Ziegler-Natta $TiCl_3$ or $TiCl_3 \cdot (AlCl_3)_{0.2-0.6}$ plus chlorine containing organoaluminum compound mixed catalyst using butene-2 or a $C_4$-cut comprising butene-2 as the polymerization solvent without the formation of propylene-butene copolymers.

8 Claims, No Drawings

PROCESS FOR THE PRODUCTION OF ISOTACTIC POLYPROPYLENE

BACKGROUND OF THE INVENTION

This invention relates to a process for the production of isotactic polypropylene and the crystalline copolymers thereof with up to 10 molar percent of butene-1 employing a mixed catalyst.

The low-pressure polymerization of propylene is generally conducted in hydrocarbons which are liquid under normal conditions, e.g., hexane, heptane or a higher-boiling aliphatic hydrocarbon. This has the disadvantage that an evaporative cooling can only be employed under low pressure so that the drying step is relatively expensive. Therefore, it is more advantageous to effect the polymerization of propylene in the monomer and/or in propylenepropane mixtures. However, due to the high vapor pressure of propylene, high pressures are required for this purpose, for example in case of polymerization temperatures of 70°–80° C., pressures of 31–37 atmospheres gauge must be employed. In the presence of hydrogen for molecular weight control, correspondingly higher pressures result. However, reactors of a large volume which can be used at these pressures can no longer be economically manufactured.

Therefore, it would be desirable if a process were available which permits the polymerization of propylene at lower pressures than is possible with butane but which permits evaporative cooling.

With respect to vapor pressure, butane is a suitable diluent. However, it has the disadvantage that the polymerization in commercial, dried butane takes place only at a low space-time yield. Butene-1 is unsuitable as a diluent, since it is polymerized along with the propylene with Ziegler-Natta catalysts. According to U.S. Pat. No. 2,956,989, butene-2 is also unsuitable as a diluent, since it is polymerized in the presence of Ziegler-Natta catalysts. According to work carried out by R. O. Symcox (J. Polymer Sci., Part B, 2 [1964] No. 10, pp. 947–949), the product is not polybutene-2, as disclosed in U.S. Pat. No. 2,956,989, but is polybutene-1, since the butene-2 is isomerized by Ziegler-Natta catalysts to butene-1, which is then polymerized to polybutene-1. The work conducted by Symcox is confirmed by further publications, e.g., T. Otsu, J. Polymer Sci. A 4 (1966), No. 6, pp. 1579–1593; Masao Iwamoto and Sadao Yuguchi, Bull. Chem. Sre., Japan, 40, pp. 159–162 (1967); German Unexamined Laid-Open Application DOS No. 1,545,042; French Pat. No. 1,415,239. According to these publications, butene-2 is not feasible as a diluent for the propylene polymerizations employing Ziegler-Natta catalysts, since, in addition to the polypropylene, larger amounts of polybutene-1 and butene-propylene copolymers would be produced.

SUMMARY OF THE INVENTION

According to this invention, isotactic polypropylene and crystalline copolymers thereof with up to 10 molar percent of butene-1 are produced by polymerization of propylene or a mixture thereof and up to 10 molar percent of butene-1, employing as a Ziegler-Natta mixed catalyst $TiCl_3$ and/or $TiCl_3 \cdot n\ AlCl_3$ wherein $n$ is 0.2 to 0.6 and a chlorine-containing organo-aluminum compound, and conducting the polymerization in butene-2 or a $C_4$-cut containing, in addition to butene-2, one or more of butane, up to 1% isobutene and up to 5% of butene-1.

DETAILED DISCUSSION

It could not be foreseen that propylene could be polymerized satisfactorily with Ziegler-Natta catalysts in butene-2 to form a highly isotactic polypropylene. Surprisingly, neither polybutene-1, which supposedly is formed according to numerous publications, nor butene-propylene copolymers are found in the reaction product. If propylene-butene-1 copolymers are desired, one must use a solvent mixture containing up to 5% butene-1.

The polymerization is conducted in a solvent consisting entirely of butene-2 or a $C_4$-cut containing, in addition to butane at least 10%, preferably at least 25% and especially at least 40% butene-2 and, when a propylene-butene copolymer is desired, up to about 5% butene-1 and from 0 to about 1% isobutene. In such solvents, the propylene is polymerized to an extent of 90–100%, the butene-1 to an extent of about 30–90%, and the butene-2 not at all. For the manufacture of highly crystalline propylenebutene-1 copolymers with up to 10% butene-1, a butene-2 and/or a butene-2/butane mixture are suitable with a butene-1 content of up to about 5%, preferably 0.1–2%. The proportion of isobutene in the solvent should, if possible, not exceed 1%. A preferred butene-2/butene mixture is obtained from the sump products of the butene-1 concentration from $C_4$-cuts, for which no field of use has been available heretofore. These materials contain, depending on the degree of concentration of butene-1, the reflux ratio, and/or the number of theoretical plates, varying amounts of trans-butene-2, cis-butene-2, butane, butene-1, and isobutene. Illustrative examples are:

38.0% trans-butene-2; 39.5% trans-butene-2
30.0% cis-butene-2; 19.8% cis-butene-2
29.0% butane; 40.2% n-butane
2.5% butene-1; 0.4% butene-1
0.4% isobutene; 0.1% isobutene.

Surprisingly, the polymerization velocity of the propylene in butene-2 and/or in $C_4$-cuts rich in butene-2, e.g., butene-2/butane mixtures, is substantially higher than in pure butane.

The polymerization is conducted employing a Ziegler-Natta catalyst and polymerization temperatures of up to about 100° C., preferably at 30°–80° C., particularly at 40°–60° C., and under pressures of up to about 25 atmospheres gauge, preferably up to 20 atm. gauge, especially 4–15 atm. gauge. At lower polymerization temperatures, polymers are obtained having a higher isotactic proportion and a higher crystallinity. Lower polymerization temperatures are of interest especially when using as solvent $C_4$-cuts which contain butene-1. The polymerization can be effected continuously and discontinuously.

Suitable Ziegler-Natta catalysts are mixed catalysts of titanium(III) chlorides and chlorine-containing organometallic compounds of aluminum. Suitable titanium trichlorides, in addition to the pure titanium trichloride, are preferably titanium-aluminum chlorides having the composition of $TiCl_3 \cdot n\ AlCl_3$ ($n = 0.2 - 0.6$) as they are produced by the reduction of titanium tetrachloride with metallic aluminum or organoaluminum compounds. During the reduction with organoaluminum compounds, the thus-obtained titanium trichloride can be separated by decanting or filtration from the main amount of organoaluminum compounds.

However, it is also possible to use the titanium trichloride without isolation, together with the organoaluminum compound, consisting essentially of alkylaluminum dichloride.

Suitable chlorine-containing organoaluminum compounds are preferably the dialkylaluminum chlorides, particularly diethylaluminum chloride. If the titanium trichloride, which has not been isolated, is used with alkylaluminum dichloride, the latter is converted, by reaction with trialkylaluminum, especially triethylaluminum, into the dialkylaluminum chloride, particularly diethylaluminum chloride. Also suitable chlorine-containing organoaluminum compounds are the alkylaluminum sesquichlorides and the alkylaluminum dichlorides, preferably in combination with electron donors.

The titanium trichloride and/or the titanium-aluminum chloride is usually used at a concentration of 0.1 - 3 millimoles/liter. The molar ratio of Al : Ti is preferably 1.1 : 1 to 3.0 : 1, especially 1.3 : 1 to 2.0 : 1.

The characteristic values for the polymer product of the examples were determined on pressed plates produced from powdered polypropylene. The mechanical values determined from the granulated material are higher by 10%, on the average.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

Employing a mixed catalyst consisting of 0.014 part by weight of a $TiCl_3$ catalyst having the composition $TiCl_3 \cdot 0.33\ AlCl_3$ (commercially available aluminum-reduced titanium trichloride) and 0.020 part by weight of diethylaluminum monochloride, 20 parts by weight of propylene (99% strength) is polymerized in 40 parts by weight of a butene-2 consisting of 91% of cis-butene-2, 8% of trans-butene-2, and 1% of butane, at 75° C., after the addition of 0.0002 part by weight of hydrogen, under a pressure of 14–10 atm. gauge. After a polymerization period of 10 hours, the polymerization is stopped by adding 0.1 parts by weight of steam. After passing the reaction product through nozzles, a polypropylene is obtained having the following characteristic values:

| | | |
|---|---|---|
| RSV | 5.5 | dl./g. |
| $MI_{190/5}$ | 1.2 | g./10 min. |
| Density | 0.904 | g./cm$^3$ |
| Heptane extract | 4.6 | % |
| Yield stress | 310 | kp./cm$^2$ |
| Tensile strength at rupture | 402 | kp./cm$^2$ |
| Elongation at rupture | 726 | % |
| Notch impact strength | 20° C. 7.2 kp.cm/cm$^2$ | |
| | 0° C. 3.1 kp.cm/cm$^2$ | |
| | −20° C. 2.2 kp.cm/cm$^2$ | |

If the polypropylene suspension is cooled, after the decomposition of the catalyst, to 30° C. and the polypropylene is separated by means of a pressure decanter, a polypropylene is obtained having the following characteristic values:

| | | |
|---|---|---|
| RSV | 5.7 | dl./g. |
| $MI_{190/5}$ | 1.0 | g./10 min. |
| Density | 0.905 | g./cm$^3$ |
| Heptane extract | 2.9 | % |
| Yield stress | 334 | kp./cm$^2$ |
| Tensile strength at rupture | 388 | kp./cm$^2$ |
| Elongation at rupture | 632 | % |
| Nitch impact strength | 6.7 | kp.cm/cm$^2$ at 20° C. |
| | 2.8 | kp.cm/cm$^2$ at 0° C. |
| | 2.0 | kp.cm/cm$^2$ at −20° C. |

EXAMPLE 2

Employing as catalyst 0.014 part by weight of the $TiCl_3 \cdot 0.33\ AlCl_3$ used in Example 1 and 0.02 part by weight of diethylaluminum monochloride, 15 parts by weight of propylene (99% strength) is polymerized in 40 parts by weight of a C$_4$-cut rich in butene-2 (sump product from a butene-1 process), consisting of 38% of trans-butene-2, 30% of cis-butene-2, 29% of butane, 2.5% of butene-1, and 0.4% of isobutene, at 65° C. after the addition of 0.0006 part by weight of hydrogen, under a pressure of 10–10 atm. gauge. After a polymerization time of 10 hours, the polymerization is stopped by adding 1 part by weight of methanol. After passing the product through nozzles, a polypropylene is obtained having the following characteristic data:

| | | |
|---|---|---|
| RSV | 2.8 | dl./g. |
| $MI_{190/5}$ | 3.1 | g./10 min. |
| Density | 0.904 | g./cm$^3$ |
| Heptane extract | 7.1 | % |
| Yield stress | 301 | kp./cm$^2$ |
| Tensile strength at rupture | 369 | kp./cm$^2$ |
| Elongation at rupture | 634 | % |
| Notch impact strength | 20° C. 6.1 kp.cm/cm$^2$ | |
| | 0° C. 2.4 kp.cm/cm$^2$ | |
| | −20° C. 2.1 kp.cm/cm$^2$ | |

According to IR analysis, the product is a propylene copolymer with 6.8% butene-1. If the polypropylene suspension is cooled, after decomposition of the catalyst, to 30° C., and the polypropylene is separated with the aid of a pressure-proof filter, a polypropylene is obtained having the following characteristic values:

| | | |
|---|---|---|
| RSV | 3.0 | dl./g. |
| $MI_{190/5}$ | 3.0 | g./10 min. |
| Density | 0.905 | g./cm$^3$ |
| Heptane extract | 3.2 | % |
| Yield stress | 324 | kp./cm$^2$ |
| Tensile strength at rupture | 363 | kp./cm$^2$ |
| Elongation at rupture | 622 | % |
| Notch impact strength | 20° C. 5.6 kp.cm/cm$^2$ | |
| | 0° C. 2.2 kp.cm/cm$^2$ | |
| | −20° C. 2.1 kp.cm/cm$^2$ | |

According to IR analysis, the polymer is a propylene copolymer with 6.0% of butene-1.

EXAMPLE 3 a. Production of a $TiCl_3 \cdot 0.5\ AlCl_3$ Catalyst

One mole of titanium tetrachloride (100% strength) is added dropwise under agitation to a 20% solution, cooled to −5° C., of 1.4 mole of ethylaluminum sesquichloride (molecular weight 123.7) in hexane within 6 hours. After a post reaction time of 15 hours at −5° C. to +10° C., the catalyst suspension is heat-treated for 6 hours at 150° C. Subsequently, the catalyst precipitate is separated and washed twice with butane. In a practically quantitative yield, 1 mole of titanium trichloride catalyst is obtained having the composition of $TiCl_3 \cdot 0.52\ AlCl_3$.

b. Polymerization

Employing as mixed catalyst 0.015 part by weight of this $TiCl_3$ catalyst and 0.022 part by weight of diethylaluminum monochloride, 20 parts by weight of propylene (99% strength) is polymerized in 40 parts by weight of a butene-2 consisting of 90% of cis-butene-2, 8% of trans-butene-2, 0.7% of butane, 1.0% of butene-1 and 0.3% of isobutene, at 80° C. after the addition of 0.0002 part by weight of hydrogen under a pressure of 14–12 atm. gauge. After a polymerization period of 6 hours, the polymerization is stopped by adding 0.1 part by weight of steam. After passing the product through nozzles, a polypropylene is obtained having the following characteristic values:

| | | |
|---|---|---|
| RSV | 4.0 | dl/g. |
| $MI_{190/5}$ | 1.7 | g./10 min. |
| Heptane extract | 6.8 | % |
| Density | 0.905 | g./cm$^3$ |
| Yield stress | 308 | kp./cm$^2$ |
| Tensile strength at rupture | 374 | kp./cm$^2$ |
| Elongation at rupture | 617 | % |
| Notch impact strength | 20° C. | 6.4 kp.cm/cm$^2$ |
| | 0° C. | 2.2 kp.cm/cm$^2$ |
| | −20° C. | 2.0 kp.cm/cm$^2$ |

According to the IR analysis, the polymer is a propylene copolymer with 0.48% of butene-1.

Comparable propylene-butene-1 copolymers are obtained employing a C$_4$-cut consisting of 39.5% of trans-butene-2, 19.8% of cis-butene-2, 40.2% of butane, 0.4% of butene-1, and 0.1% of isobutene.

EXAMPLE 4 a. Production of a $TiCl_3 \cdot 0.5\ AlCl_3$ Catalyst Suspension

One mole of titanium tetrachloride (100%) is added dropwise under agitation within 6 hours to a 20% solution of 1.4 moles of ethylaluminum sesquichloride (molecular weight 123.7) in butane, cooled to −5° C. To carry out the post reaction, the suspension is stirred for 15 hours at −5° C. to +10° C. and the catalyst is then heat-treated for 6 hours under agitation at 140° C.

b. Polymerization

Into a pressure-resistant agitator-equipped vessel, 600 parts by weight of a C$_4$-cut rich in butene-2 and containing 38% of trans-butene-2, 30% of cis-butene-2, 29% of butane, 2.5% of butene-1, and 0.4% of isobutene; the catalyst suspension produced according to the description in this example; 1.14 parts by weight (1 mole) of triethylaluminum; 0.005 part by weight of hydrogen; and 250 parts by weight of propylene per hour are charged continuously at 70° C. The polymerization is conducted under a pressure of 11 atm. gauge and with an average residence time of 12 hours. The thus-produced polypropylene suspension is transferred, via a check valve controlled by the control platform, into a second, pressure-resistant agitator-equipped vessel, wherein 10 parts by weight of steam is added per hour. From this vessel, the polypropylene is obtained by passing the latter through nozzles. This product has the following properties:

| | | |
|---|---|---|
| RSV | 4.2 | dl./g. |
| $MI_{190/5}$ | 1.8 | g./10 min. |
| Density | 0.964 | g./cm$^3$ |
| Heptane extract | 6.9 | % |
| Yield stress | 298 | kp./cm$^2$ |
| Tensile strength at rupture | 352 | kp./cm$^2$ |
| Elongation at rupture | 599 | % |
| Notch impact strength | 20° C. | 6.6 kp.cm/cm$^2$ |
| | 0° C. | 2.4 kp.cm/cm$^2$ |
| | −20° C. | 2.2 kp.cm/cm$^2$ |

According to the IR analysis, the polymer is a propylene-1 copolymer with 5.1% of butene-1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of isotactic polypropylene and crystalline copolymers thereof with up to 10 molar percent of butene-1 by the suspension polymerization of propylene under pressure at 40°–100° C. employing a Ziegler-Natta mixed catalyst containing $TiCl_3 \cdot nAlCl_3$ wherein $n = 0.2$ to 0.6, and employing a hydrocarbon diluent to produce a suspension of the polypropylene in the diluent, the improvement which comprises employing as the diluent butene-2 or a C$_4$-cut consisting of at least 25% butene-2 and, in addition to butane, 0 to 5% of butene-1 and 0 to 1% isobutene and employing a catalyst consisting of a mixture of $TiCl_3 \cdot nAlCl_3$ as defined above and a chlorine-containing organoaluminum compound.

2. The process of claim 1 wherein the polymerization is conducted in a C$_4$-cut consisting of at least 25% butene-2 and containing 0.1–2% butene-1.

3. The process of claim 1 wherein the polymerization is conducted in a C$_4$-cut consisting of at least 40% butene-2 and containing 0.1–2% butene-1.

4. A process according to claim 1 wherein the polymerization is conducted in butene-2.

5. A process according to claim 1 wherein the polymerization is conducted at 40°–60° C. and 4–15 atmospheres pressure gauge and the catalyst is a $TiCl_3 \cdot nAlCl_3$ catalyst, wherein the Al:Ti molar ratio is 1.3 : 1 to 2.0 : 1, in mixture with diethylaluminum monochloride.

6. A process according to claim 1 wherein the polymerization is conducted continuously.

7. A continuous polymerization process according to claim 1 wherein the polymerization is conducted in a C$_4$-cut consisting of at least 40% butene-2 and containing 0.1–2% butene-1 and wherein the polymerization is conducted at 40°–60° C. and 4–15 atmospheres pressure gauge and the catalyst is a TiCl$_3$ . $n$AlCl$_3$ catalyst, wherein the Al:Ti molar ratio is 1.3 : 1 to 2.0 : 1, in mixture with diethylaluminum monochloride.

8. A continuous polymerization process according to claim 1 wherein the polymerization is conducted in butene-2 and wherein the polymerization is conducted at 40°–60° C. and 4–15 atmospheres pressure gauge and the catalyst is a TiCl$_3$ . $n$AlCl$_3$ catalyst, wherein the Al:Ti molar ratio is 1.3 : 1 to 2.0 : 1, in mixture with diethylaluminum monochloride.

* * * * *